United States Patent [19]

Shimomura et al.

[11] Patent Number: 5,141,021

[45] Date of Patent: Aug. 25, 1992

[54] MASS FLOW METER AND MASS FLOW CONTROLLER

[75] Inventors: Mitsuzo Shimomura; Masao Yamaguchi, both of Minami, Japan

[73] Assignee: Stec Inc., Kyoto, Japan

[21] Appl. No.: 756,192

[22] Filed: Sep. 6, 1991

[51] Int. Cl.⁵ ............................................. G05D 7/06
[52] U.S. Cl. .................................. 137/486; 137/487.5
[58] Field of Search ......................... 137/486, 487.5, 8

[56] References Cited

U.S. PATENT DOCUMENTS

| | | | |
|---|---|---|---|
| 3,552,428 | 1/1971 | Pemberton | 137/486 |
| 4,487,213 | 12/1984 | Gates | 137/486 X |
| 4,658,855 | 4/1987 | Doyle | 137/486 X |
| 4,687,020 | 8/1987 | Doyle | 137/486 |
| 4,877,051 | 10/1989 | Day | 137/486 |
| 4,921,005 | 5/1990 | Ohmi | 137/486 |

Primary Examiner—Alan Cohan
Attorney, Agent, or Firm—Price, Gess & Ubell

[57] ABSTRACT

The output from the sensor detecting the flow rate of the fluid passing through the conduit is compared with the ceiling value and the appointed compensating signal is added to the output from the sensor to display the signal obtained on the basis of this addition result as the value of flow rate or reduce the openness of the control valve on the basis of the above described signal when the output from the sensor is larger than the threshold value, so that the mass flow meter can accurately display the flow rate even when the fluid passes in an excessive flow rate. In addition, even though the mass flow meter and the mass flow controller are fallen into the abnormal operating condition due to an excessive flow rate of fluid, they can be quickly returned to the normal operating condition.

6 Claims, 5 Drawing Sheets

MASS FLOW METER AND MASS FLOW CONTROLLER

BACKGROUND OF THE INVENTION

1. Field of the Invention

The present invention relates to a mass flow meter and a mass flow controller.

2. Description of the Prior Art

For example, in the case where an apparatus for producting semiconductors is supplied with various kinds of gas used for producing semiconductors, their supply passages are provided with a mass flow controller, respectively, to control flow rates of the respective gases.

FIG. 5 schematically shows a construction of a control system of the general mass flow controller 50. Referring to FIG. 5, reference numeral 51 designates a flow rate-measuring portion comprising a thermal flow rate sensor 54 provided in a measuring passage 53, a bridge circuit 55 and an amplification circuit 56 for measuring a flow rate of a gas G passing through a passage 52 to put out a flow rate signal (x) corresponding to said flow rate of said gas G. And, reference numeral 57 designates a by-pass passage provided so as to bypass said measuring passage 53. Said by-pass passage 57 is provided with a by-pass portion 58 having constant-flow rate-ratio characteristics. In addition, reference numeral 59 designates a control valve provided on the downstream side of the confluence of the measuring passage 53 and said by-pass passage 57. Reference numeral 60 designates a comparison circuit for comparing said flow rate signal (x) put out from said flow rate-measuring portion 51 with a flow rate-setting signal (y) from a flow rate-setting portion (not shown), reference numeral 61 designating a control circuit, and reference numeral 62 designating a control valve-driving circuit.

And, with the mass flow controller 50 having the above described construction, when the flow rate signal (x) is larger than said flow rate-setting signal (y), an instruction for reducing an openness of said control valve 59 is given from said control circuit 61, while, when the flow rate signal (x) is smaller than the flow rate-setting signal (y), an instruction for increasing said openness of the control valve 59 is given from the control circuit 61, so as to supply an apparatus (not shown) provided on the downstream side of the mass flow controller 50 with an appointed flow rate of gas G.

However, in the conventional mass flow controller 50, in order to prevent an excessive flow rate of gas G from passing through the measuring passage 53, the control valve 59 of small flow rate has been incorporated. The openness of the control valve 59 in the mass flow controller, of which full-scale flow rate is for example 5 ml/min, has been set so that the gas G may pass at a flow rate of merely about 7 to 8 ml/min when a differential pressure is 0.5 kg/cm²G. And, even though said differential pressure was 3.0 kg/cm²G, the gas G could be passed at a flow rate of merely about 50 ml/min.

Accordingly, in the mass flow controller 50 with the control valve 59 of small flow rate incorporated therein, as above described, it has taken a long time to conduct a formation of a vacuum in a gas line, a displacement of an inside of said gas line with an inert gas and the like.

On the contrary, a by-pass line 63 has been provided in parallel to a mass flow controller 50, as shown by for example an imaginary line in FIG. 5, but, in this case, a disadvantage has occurred in that the whole construction is complicated and large-scaled.

So, the above described problems can be solved by incorporating a control valve, which can pass a gas at a sufficiently large flow rate, in a mass flow controller of small flow rate.

However, in the case where said control valve, which can pass a gas at a sufficinetly large flow rate, is incorporated in said mass flow controller of small flow rate under the conventional technical condition, the following problems occur anew.

That is to say, flow-rate output characteristics of a general flow rate-measuring portion 51 as shown in FIG. 5 produce an inversion of phenomenon when a flow rate exceeds an appointed limit, as shown in FIG. 6. In FIG. 6, an axis of abscissa shows said flow rate of gas (fluid) passing through said mass flow controller 50 while an axis of ordinate shows an output from said flow rate-measuring portion 51.

And, the mass flow controller 50 having such the characteristics is usually used within a normal operation range N encircled by an imaginary line in FIG. 6, but, when an excessive flow rate of gas G exceeding said normal operation range N is suddenly passed through the mass flow controller 50, said output is reduced in spite of said excessive flow rate of gas G in the case where for example an internal volume of a gas passage 52 from a thermal flow rate sensor 54 to a control valve 59 is large or a response speed of said control valve 59 is small. Accordingly, although a signal for closing the control valve 59 is ought to be originally put out from a control circuit 61, contrarily a signal for further opening said control valve 59 is put out from said control circuit 61 and thus the mass flow controller 50 is fallen into an abnormal operating condition when for example the flow rate exceeds $Q_x$ in FIG. 6.

Such the problems have occurred also in a mass flow meter having a construction almost same as that of the above described mass flow controller 50 from which the control valve 59 and a member for opening and closing the control valve 59 are removed. That is to say, in this mass flow meter, a value of flow rate indicated has been reduced in spite of an excessive flow rate of gas G and thus an indication corresponding to the real flow rate has not been given.

SUMMARY OF THE INVENTION

The present invention has been achieved paying attention to the above described matters and it is an object of the present invention to provide a mass flow meter and a mass flow controller having no above described disadvantage.

In order to achieve the above described object, a mass flow meter according to the present invention is adapted to compare an output from a sensor detecting a flow rate of a fluid passing through a conduit with the threshold value and add an appointed compensating signal to said output from said sensor, whereby temporarily displaying a signal obtained on the basis of the result of the addition as a value of flow rate at that time, when the output from the sensor is larger than the threshold value.

And, a mass flow controller according to the present invention is adapted to compare an output from a sensor detecting a flow rate of a fluid passing through a conduit with the threshold value and add an appointed compensating signal to said output from said sensor, whereby reducing an openness of a control valve on the basis of a signal obtained on the basis of the result of the addition, when the output from the sensor is larger than the threshold value.

In the case where said flow rate of said fluid passing through said mass flow meter exceeds a normal operation range, said value of flow rate displayed exceeds the maximum value within said normal operation range, in short a full-scale value, and thus a display corresponding to the flow rate of the fluid passing through the mass flow meter is made by adding the compensating signal to the output from the sensor.

And, in the case where said flow rate of said fluid passing through said mass flow controller exceeds a normal operation range, the compensating signal is added to the output from the sensor to reduce said openness of said control valve on the basis of said signal obtained on the basis of the result of the addition.

DETAILED DESCRIPTION OF THE PREFERRED EMBODIMENTS

The preferred embodiments of the present invention will be below described with reference to the drawings.

Figure 1:
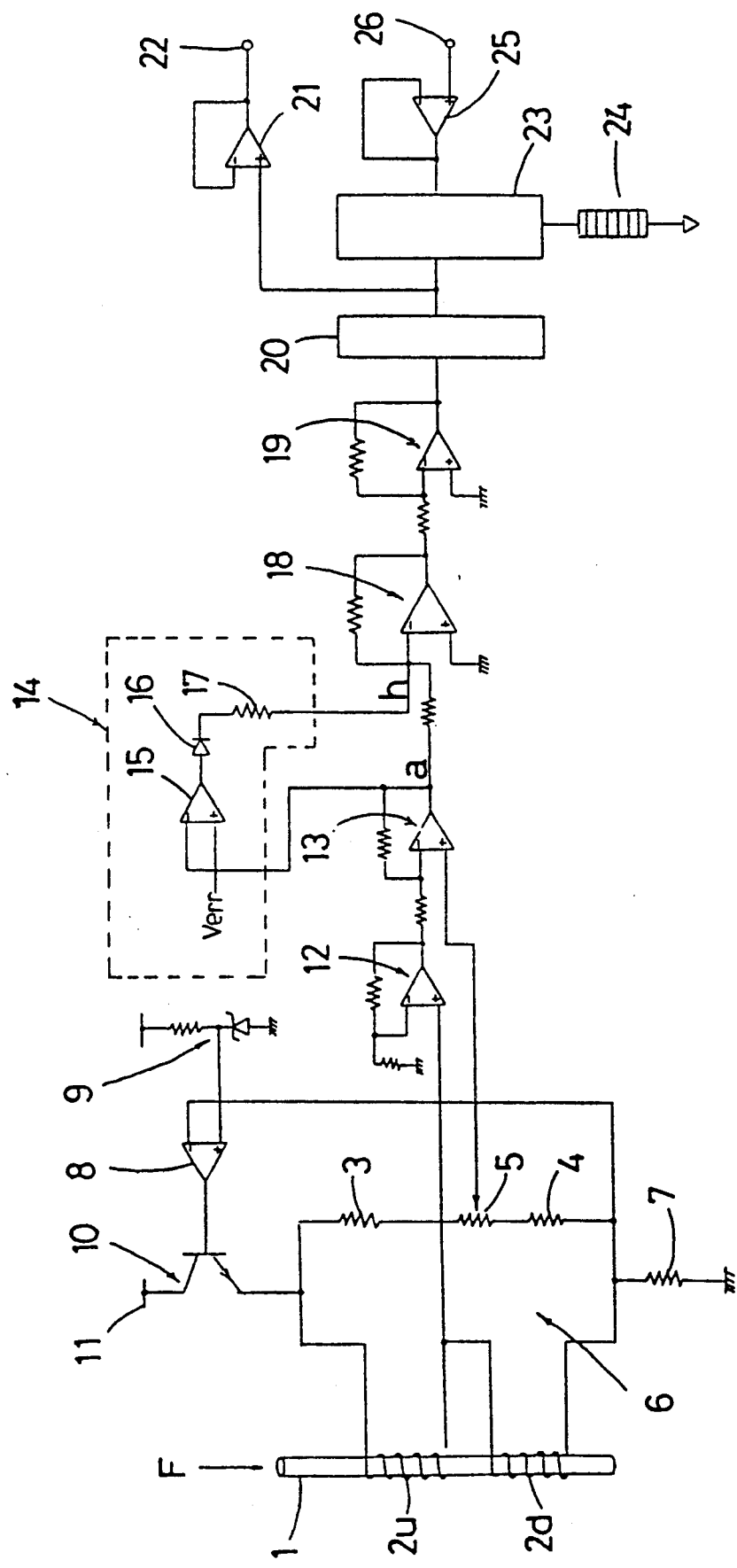
FIG. 1 is a diagram showing a construction of a control system in a mass flow controller according to one preferred embodiment of the present invention.

FIG. 1 shows an example of a control system in a mass flow controller according to the present invention. Referring to FIG. 1, reference numeral 1 designates a conduit as a passage to be measured through which a fluid F passes in the direction shown by an arrow. Reference numerals 2u, 2d designate thermal flow rate sensors (hereinafter referred to as sensors) wound around said conduit 1 independently to each other. Said sensors 2u, 2d form a bridge circuit 6 together with resistances 3, 4, a variable resistance 5 and the like. In addition, reference numeral 7 designates a resistance for detecting an electric current passing through said bridge circuit 6.

Reference numeral 8 designates an error amplifier operating so that a voltage converted by said current-detecting resistance 7 may always equal to a reference voltage from a reference voltage source 9. Reference numeral 10 designates a transistor as a switching element and reference numeral 11 designates a power source for supplying the bridge circuit 6 with an appointed electric power.

Reference numerals 12, 13 designate a differential amplifier provided on an output side of the bridge circuit 6 and the above described construction is unchanged from that of the conventional mass flow controller. And, an output (a) of said differential amplifier 13 expresses a flow rate of a fluid passing through the conduit 1 {hereinafter referred to as a sensor output (a)}.

Reference numeral 14 designates an abnormal output-detecting and compensating signal-putting out circuit (hereinafter referred to as a compensating signal-putting out circuit) detecting whether said sensor output (a) exceeds a normal operation range of said mass flow controller or not and putting out an appointed compensating signal (h) merely in the case where the sensor output (a) exceeds said normal operation range so that the sensor output (a) may be put in one input terminal, that is an input terminal on the − side, of a comparator 15 and for example a ceiling value $V_{err}$, which is slightly larger than the maximum value (full-scale value) of flow rate within the normal operation range, may be put in the other input terminal, that is an input terminal on the + side, of said comparator 15. In addition, reference numeral 16 designates a diode for preventing a back current and reference numeral 17 designates a resistance.

Reference numeral 18 designates an addition circuit for adding said compensating signal (h) to the sensor output (a) and an output from said addition circuit 18 is put in a linearizer 20 through an inversion amplifier 19. Reference numeral 21 designates an amplifier, reference numeral 22 designating an output terminal of a display portion displaying a value of flow rate, reference numeral 23 designating a control circuit for controlledly driving a control valve 24 provided in said fluid passage of the mass flow controller, and reference numeral 25 designating a buffer for putting a set value from a set input terminal 26 in said control circuit 24.

Next, an operation of the mass flow controller having the above described construction will be below described with reference to also FIG. 2.

Figure 2:
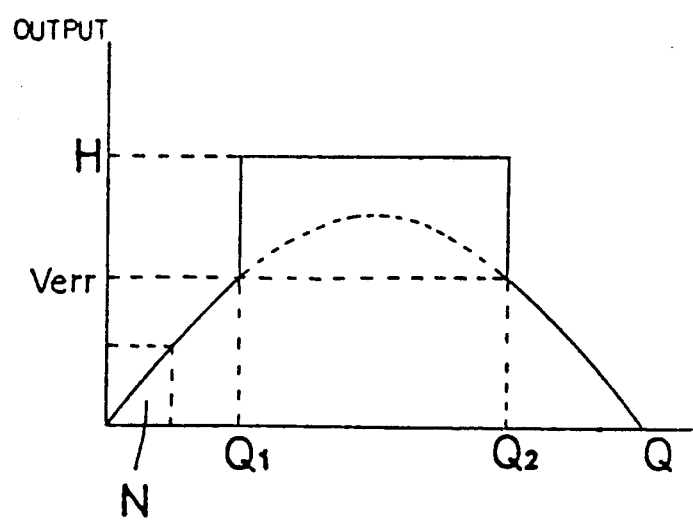
FIG. 2 is a diagram showing flow rate-output characteristics for describing an operation of said control system shown in FIG. 1.

At first, when said fluid F passes through the conduit 1 at a small flow rate and the sensor output (a) exists within the normal operation range N shown in FIG. 2, the sensor output (a) from the differential amplifier 13 is smaller than the threshold value $V_{err}$, so that the compensating signal (h) is not put out from said compensating signal-putting out circuit 14. Accordingly, said output put out from the addition circuit 18 is equal to the sensor output (a) and transmitted to said control circuit 23 and said output terminal 22 of said display portion, respectively. And, in the control circuit 23, the output put out from the addition circuit 18 is compared with said set value from said set input terminal 26 to conduct an appointed control for said control valve 24 on the basis of the obtained comparison result. In addition, in the display portion, said value of flow rate is displayed on the basis of the signal put out from the addition circuit 18.

And, when the fluid F passes through the conduit 1 at an excessive flow rate exceeding the threshold value $V_{err}$, the sensor output (a) becomes larger than the threshold value $V_{err}$, so that the compensating signal (h) is put out from the compensating signal-putting out circuit 14 to be put in the addition circuit 18 and thus a signal (shown by a mark H in FIG. 2) larger than the threshold value $V_{err}$ is put out from the addition circuit 18. Accordingly, said signal H is put in the control circuit 23 through said inversion amplifier 19 and said linearizer 20, whereby the control valve 24 is controlled so as to reduce an openness thereof. As a result, the mass flow controller can be returned to the normal operating condition. In addition, in this time, although the value of flow rate exceeding the full-scale value is temporarily displayed in the display portion on the basis of the signal H, the normal display is made with the return of the mass flow controller to the normal operating condition.

In addition, referring to FIG. 2, the compensating signal (h) is adapted to be put out merely at the flow rate of $Q_1$ to $Q_2$ and not to be put out at the flow rate exceeding $Q_2$, the control valve 24 is usually operated until the flow rate arrives at said value exceeding $Q_2$, no problem occurs.

Although the bridge circuit 6 has a so-called constant-current type construction in the above described preferred embodiment, the present invention is not limited by it. The present invention may be applied to a mass flow controller using a so-called constant-temperature type bridge shown in FIG. 3.

Figure 3:
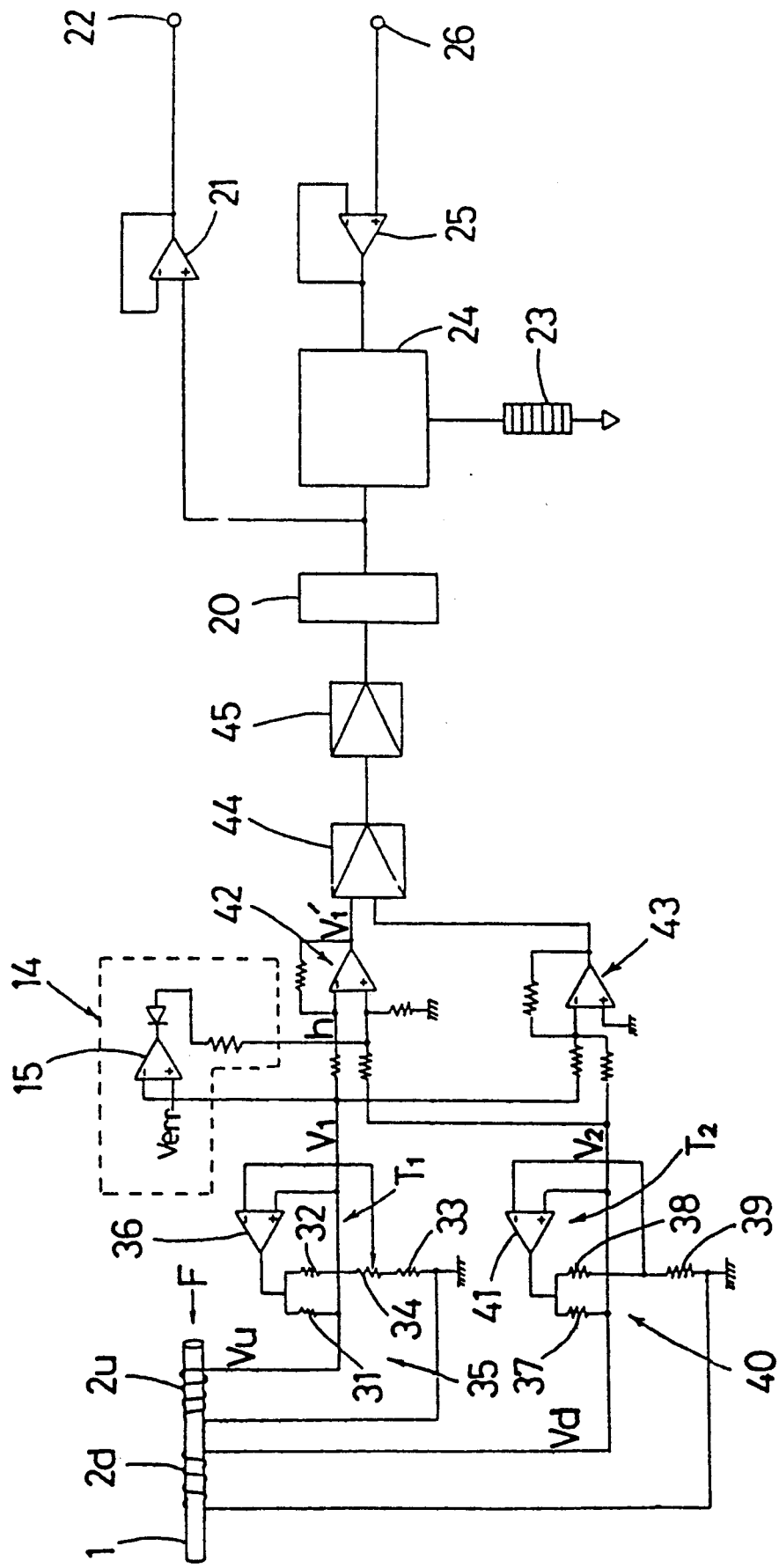
FIG. 3 is a diagram showing a control system in a mass flow controller according to another preferred embodiment of the present invention.

Referring to FIG. 3, $T_1$ and $T_2$ designates a constant-temperature control circuit comprising a sensor $2u$, $2d$ as a constituent element of a bridge circuit 35, 40, which will be mentioned later, respectively. Said constant-temperature control circuits $T_1$, $T_2$ are composed of parts identical with each other and conduct the control so that the respective temperatures of said sensors $2u$, $2d$ may be always constant. That is to say, one constant-temperature control circuit $T_1$ is composed of a bridge circuit 35 comprising the sensor $2u$, a temperature-setting resistance 31 for this sensor $2u$, bridge resistances 32, 33 and a variable resistance 34 and a control circuit 36. And, the other constant-temperature control circuit $T_2$ is composed of a bridge circuit 40 comprising the sensor $2d$, a temperature-setting resistance 37 for this sensor $2d$ and bridge resistances 38, 39 and a control circuit 41.

Reference numeral 42, 43 designates a subtraction circuit and an addition circuit, respectively, for subtracting and adding the respective outputs $V_1$, $V_2$ from the respective constant-temperature control circuits $T_1$, $T_2$ to put out a subtraction output $(V_1-V_2)$ and an addition output $(V_1+V_2)$, respectively. In addition, reference numeral 44 designates a division circuit for dividing said subtraction output $(V_1-V_2)$ by said addition output $(V_1+V_2)$ to put out a division output $(V_1-V_2)/(V_1+V_2)$. Reference numeral 45 designates an amplifier.

And, in this preferred embodiment, a signal based on an output $V_u$ from the sensor $2u$ on the upstream side in a conduit 1 is put in a comparator 15 of a compensating signal-putting out circuit 14 to be compared with the threshold value $V_{err}$ and an output (h) from said comparator 15 is added to said substraction circuit 42.

An operation of said mass flow controller shown in FIG. 3 is nearly same as that of the mass flow controller shown in the above described FIG. 1, so that its description is omitted.

Figure 4A:
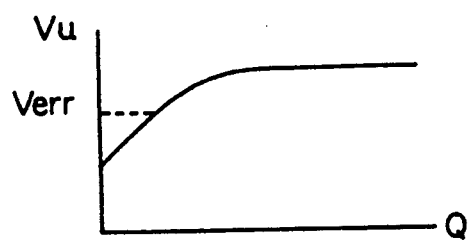
FIG. 4 is a diagram for describing an operation of said control system shown in FIG. 3.
Figure 4B:
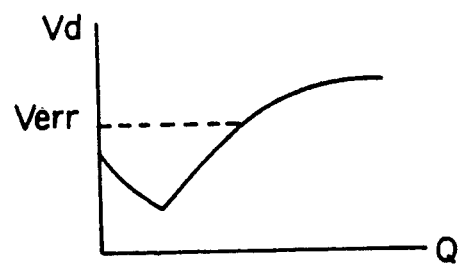
Figure 4C:
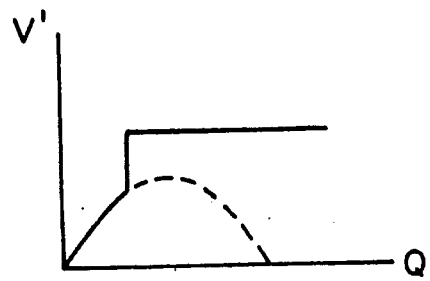
Figure 5:
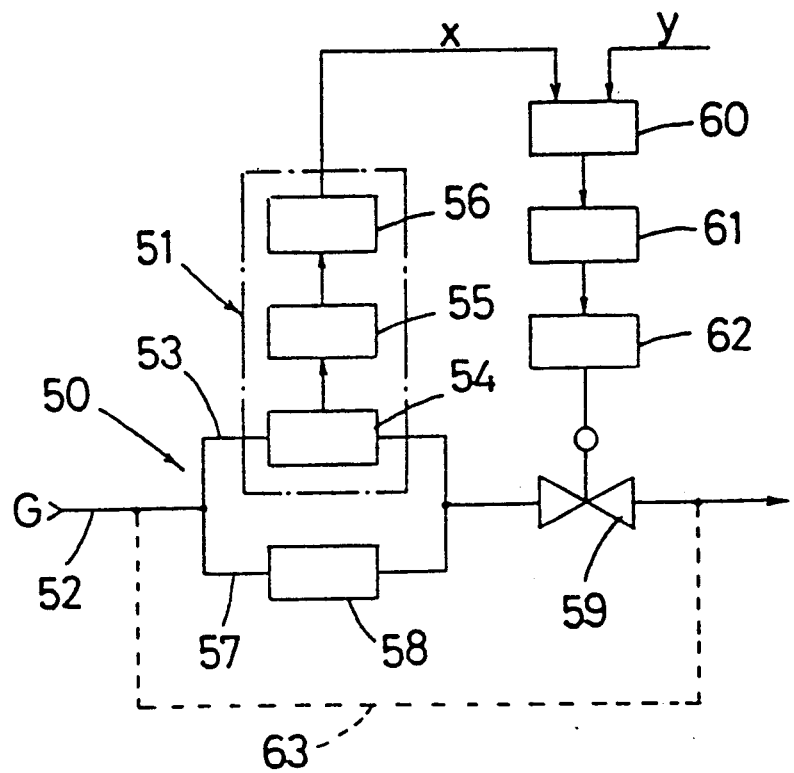
FIG. 5 is a diagram showing a construction of a control system in the general mass flow controller.
Figure 6:
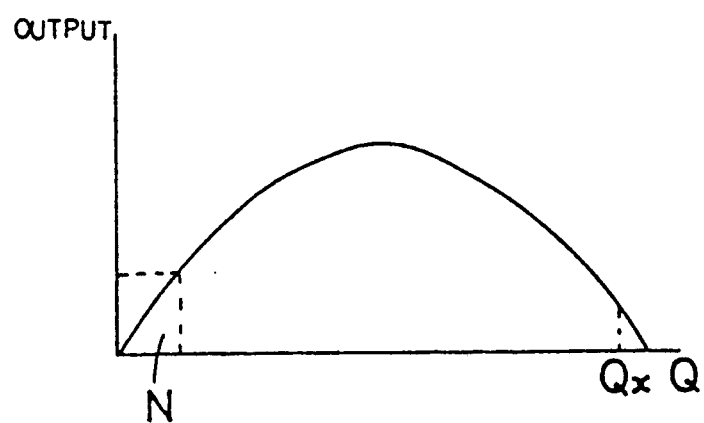
FIG. 6 is a diagram showing flow rate-output characteristics of said mass flow controller shown in FIG. 5.

In addition, although said signal based on said output $V_u$ from the sensor $2u$ on the upstream side in said conduit 1 is compared with the threshold value $V_{err}$ in a preferred embodiment shown in FIG. 3, a signal $V_d$ from the sensor $2d$ on the downstream side may be compared with the threshold value $V_{err}$. However, as shown in FIG. 4(A), (B), an advantage occurs for the case where the signal based on the output $V_u$ from the sensor $2u$ on the upstream side is compared with the threshold value $V_{err}$ in that a response speed is increased. In addition, FIG. 4(C) shows flow rate-output characteristics in the case where the signal based on the output $V_u$ from the sensor $2u$ on the upstream side is compared with the threshold value $V_{err}$. $V'$ shows an output after said compensating signal (h) from said compensating signal-putting circuit 14 was added.

As above described, according to the present invention, the output from the sensor detecting the flow rate of the fluid passing through the conduit is compared with the ceiling value and the appointed compensating signal is added to the output from the sensor to display the signal obtained on the basis of this addition result as the value of flow rate or reduce the openness of the control valve on the basis of the above described signal when the output from the sensor is larger than the threshold value, so that the mass flow meter can accurately display the flow rate even when the fluid passes in an excessive flow rate. In addition, even though the mass flow controller is fallen into the abnormal operating condition due to an excessive flow rate of fluid, it can be quickly returned to the normal operating condition.

And, according to the present invention, the control valve capable of passing a sufficiently large flow rate of gas therethrough can be incorporated in the mass flow controller of a small flow rate, so that the evacuation of the gas line, the displacement of the gas line with the inert gas and the like can be conducted within a short time.

What is claimed is:

1. A mass flow meter control system comprising:
   a fluid flow control valve configured to be in a fluid path and controlled by a control signal;
   a fluid flow sensor for detecting the flow rate of a fluid in the fluid path, and providing a corresponding flow rate signal;
   means for comparing the detected flow rate signal of a fluid with a predetermined value to determine an abnormal flow rate;
   means for providing a compensation signal when an abnormal flow rate is detected by the comparing means;
   means for adding the compensation signal to the flow rate signal to provide an output signal, and
   means for comparing the output signal with a predetermined desired flow rate signal and providing a control signal to be applied to the fluid flow control valve in response to the comparison to adjust the flow rate to the desired flow rate if necessary.

2. The mass flow meter control system of claim 1 wherein the fluid flow sensor includes a pair of thermal flow rate sensors.

3. The mass flow meter control system of claim 1 wherein the fluid flow sensor includes a constant-temperature bridge circuit.

4. The mass flow meter control system of claim 1 wherein the means for comparing the detected flow rate signal includes a predetermined flow rate value that is above a predetermined normal flow rate signal.

5. The mass flow meter control system of claim 1 wherein the means for comparing the detected flow rate includes means for limiting the provision of a compensation signal to a range of flow rates between a minimum flow rate $Q_1$ and a maximum flow rate $Q_2$ above a predetermined normal flow rate.

6. A mass flow meter control system comprising:
   a fluid flow control valve configured to be in a fluid path and controlled by a control signal;
   a fluid flow sensor means for detecting the flow rate of a fluid in the fluid path and providing a corresponding flow rate signal;
   means for compensating for an excessive flow rate above a predetermined operative flow rate, including:

means for comparing the detected flow rate signal of a fluid with a predetermined value to determine an abnormal flow rate and for providing a compensation signal when an abnormal flow rate is detected; and means for adding the compensation signal to the flow rate signal to provide an output signal, and means for comparing the output signal with a predetermined desired flow rate signal and providing a corresponding control signal to be applied to the fluid flow control valve to adjust the flow rate to the desired flow rate if necessary.

* * * * *